United States Patent
Wang et al.

(10) Patent No.: US 9,237,116 B2
(45) Date of Patent: Jan. 12, 2016

(54) NETWORK SYSTEM TIME DOMAIN RE-STAMPING

(71) Applicant: CISCO TECHNOLOGY, INC., San Jose, CA (US)

(72) Inventors: Xuan Wang, Shanghai (CN); Jingfeng Zhang, Tianjin (CN); Jie Meng, San Jose, CA (US); Wenwen Dong, Shanghai (CN); De Fu Li, Wayland, MA (US); Yong Lu, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 252 days.

(21) Appl. No.: 14/025,338

(22) Filed: Sep. 12, 2013

(65) Prior Publication Data

US 2015/0071305 A1     Mar. 12, 2015

(51) Int. Cl.
| | |
|---|---|
| *H04L 12/28* | (2006.01) |
| *H04L 12/919* | (2013.01) |
| *H04N 21/434* | (2011.01) |
| *H04L 29/06* | (2006.01) |
| *H04N 21/61* | (2011.01) |

(52) U.S. Cl.
CPC ............. *H04L 47/765* (2013.01); *H04L 65/80* (2013.01); *H04N 21/4344* (2013.01); *H04L 65/104* (2013.01); *H04N 21/6118* (2013.01)

(58) Field of Classification Search
CPC ..... H04L 47/765; H04L 65/80; H04L 65/104; H04N 21/4344
See application file for complete search history.

(56) References Cited

U.S. PATENT DOCUMENTS

| | | | |
|---|---|---|---|
| 7,539,208 B2 | 5/2009 | Chapman et al. | |
| 7,720,101 B2 | 5/2010 | Chapman et al. | |
| 7,769,046 B1 | 8/2010 | Crocker | |
| 8,160,093 B2 | 4/2012 | Chapman et al. | |
| 8,819,161 B1 * | 8/2014 | Pannell et al. | 709/208 |
| 2009/0073971 A1 * | 3/2009 | Taaghol | 370/389 |
| 2009/0185574 A1 | 7/2009 | Chapman et al. | |
| 2010/0142553 A1 | 6/2010 | Kolze | |
| 2012/0300859 A1 | 11/2012 | Chapman et al. | |
| 2013/0128868 A1 | 5/2013 | Li et al. | |
| 2013/0232537 A1 * | 9/2013 | Montojo et al. | 725/129 |
| 2013/0343754 A1 * | 12/2013 | Shellhammer et al. | 398/43 |

FOREIGN PATENT DOCUMENTS

| | | |
|---|---|---|
| WO | WO 2011/035680 A1 | 3/2011 |
| WO | WO 2013/126298 A1 | 8/2013 |

OTHER PUBLICATIONS

John T. Chapman, "Timing for DOCSIS Networks"; Presentation, Cisco Systems, Inc., 2006, 36 pgs.

* cited by examiner

*Primary Examiner* — Robert Wilson
(74) *Attorney, Agent, or Firm* — Merchant & Gould P.C.

(57) ABSTRACT

One embodiment of the invention includes a coax media converter (CMC) system communicatively coupled to at least one modem in a network system. The system includes a frequency reference configured to generate a clock signal in a local time domain. The system also includes a scheduling processor configured to extract a bandwidth allocation message from a data stream and to re-stamp each of at least one timestamp in the bandwidth allocation message in the local time domain based on the clock signal to generate a corresponding updated bandwidth allocation message comprising a respective at least one re-stamped timestamp. The system further includes a downstream physical interface configured to transmit the updated bandwidth allocation message to the at least one modem to schedule upstream burst transmissions from the respective at least modem based on the at least one re-stamped timestamp.

20 Claims, 3 Drawing Sheets

NETWORK SYSTEM TIME DOMAIN RE-STAMPING

TECHNICAL FIELD

This disclosure relates to network system time domain re-stamping.

BACKGROUND

Some network systems implement a variety of media through which data is transmitted. For example, a Hybrid Fiber Coaxial (HFC) cable access network can be implemented in a network system to provide broadcast media (e.g., a motion picture experts group (MPEG) data stream) for a plurality of subscribers over an optical fiber medium that is converted to a coaxial cable medium. In such a network system, cable modems can provide requests for bandwidth and implement data communications, such as according to a Data-Over-Cable Service Interface Specification (DOCSIS). For example, the cable modem can communicate with upstream network equipment in the network system via upstream burst transmissions that can be allocated by a bandwidth allocation message (e.g., an Upstream Bandwidth Allocation Map (MAP) message) that is provided from a network termination system (e.g., a cable modem termination system (CMTS)). Accordingly, the cable modems can schedule respective upstream burst transmissions according to the timing set forth in the bandwidth allocation message.

DESCRIPTION OF EXAMPLE EMBODIMENTS

Overview

This disclosure relates generally to network systems, and specifically to network system time domain re-stamping. In a network system, a Coax Media Converter (CMC) can interconnect a network termination system (e.g., a modular cable modem termination system (M-CMTS)) and a plurality of cable modems (e.g., each corresponding to a given subscriber). The network termination system can be configured to generate bandwidth allocation messages that each provides timeslots to designate respective times in which the cable modems can schedule upstream burst messages, with each of the timeslots being dictated by respective timestamps. The CMC can be remotely located relative to the network termination system and connected with the network system (e.g., via an optical fiber connection). The CMC thus can implement a separate time domain from the network termination system, such as based on having different clocks. The CMC can extract the bandwidth allocation messages, such as from a data stream (e.g., a motion picture experts group (MPEG) data stream), analyze the timestamps in the bandwidth allocation message, and modify (e.g., re-stamp) the timestamps in a local time domain.

The updated bandwidth allocation message can then be inserted into the data stream to be transmitted to the cable modems. The cable modems can thus schedule respective upstream burst transmissions based on the re-stamped timestamps in the local domain provided by the CMC. The CMC can receive the upstream burst transmissions that are provided at the times designated in the updated bandwidth allocation message and can packetize the upstream burst transmissions for transmission upstream to the network termination system. The algorithm implemented by the CMC for the re-stamping of the timestamps in the bandwidth allocation message can be programmed to accommodate an underscheduling condition, such as resulting from the clock in the time domain of the network termination system being slower than the clock in the time domain of the CMC. Additionally, the CMC can be configured to detect an overscheduling condition, such as resulting from the clock in the time domain of the network termination system being faster than the clock in the time domain of the CMC. In response, as one example, the CMC can instruct the network termination system to adjust the speed of the clock in the network termination system time domain. As another example, the CMC can implement re-stamping of the timestamps in the bandwidth allocation message in a manner that mitigates contention region timing, and thus can accommodate the scheduling of upstream burst transmissions in less time.

Example Embodiments

Figure 1:
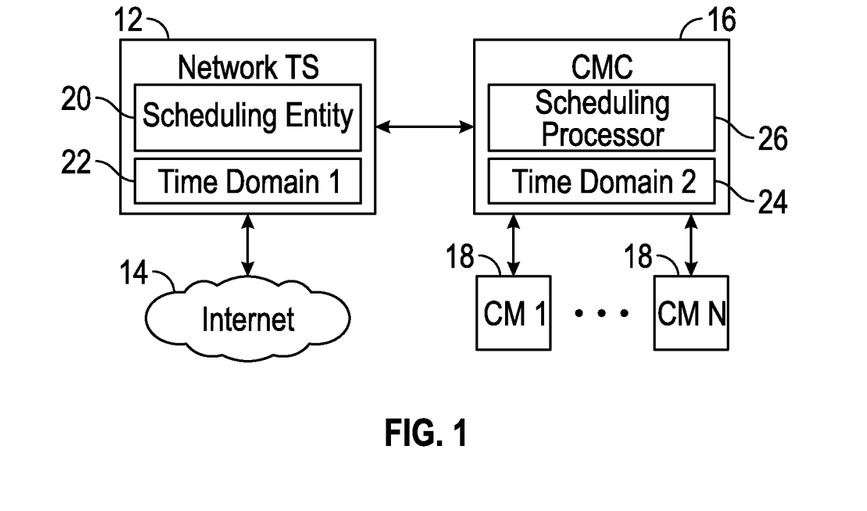
FIG. 1 illustrates an example of a network system.

FIG. 1 illustrates an example of a network system 10. The network system 10 can be configured as any of a variety of networks, such as a Hybrid Fiber Coaxial (HFC) cable access network that can be implemented in a network system to provide broadcast media for a plurality of subscribers. The network system 10 includes a network termination system (TS) 12 that can provide connectivity to a wide area network, such as including the Internet, demonstrated at 14.

As an example, the network TS 12 can be a modular cable modem termination system (M-CMTS) that is configured for operation according to one of Data-Over-Cable Service Interface Specification (DOCSIS) network standards. The network TS 12 can thus operate as a service flow engine to a plurality of network service subscribers in the network system 10. The network TS 12 can also be coupled to a variety of additional network components and resources (not shown), such as a policy server, a provisioning system, and/or other service provider components.

The network system 10 also includes a Coax Media Converter (CMC) 16 that can be coupled to the network TS 12, such as via a fiber-optic connection. The CMC 16 can be an apparatus that interconnects the network TS 12 and a plurality N of cable modems 18, where N is a positive integer denoting the number of cable modems. As an example, the cable modems 18 can be coupled to the CMC 16 via respective coaxial cable connections. In such example, the CMC 16 can be configured to provide an interface between the optical connection to the network TS 12 and the coaxial connection to the cable modems 18. For example, the CMC 16 can be configured (e.g., according to a DOCSIS standard) to convert an optical data stream from the network TS to a corresponding electrical data stream and to convert electrical data streams from cable modems to optical data streams for transmission to the network TS.

The network TS 12 can include a scheduling entity 20 and a first time domain 22 that can be defined by a clock system in the network TS 12. The scheduling entity 20 is configured to generate a bandwidth allocation message, such as an Upstream Bandwidth Allocation Map (MAP) message, that can include instructions to allocate bandwidth to the cable modems 18, such as in a time-division multiplexed manner. For example, each of the cable modems 18 can correspond to a given subscriber that can have a respective subscriber plan, such defining an amount of bandwidth (e.g., upstream and/or downstream) available to the respective cable modem 18. The bandwidth allocation message that is generated by the scheduling entity 20 can specify time slots for the respective cable modems 18 in which the cable modems 18 can provide upstream burst data transmissions for requesting bandwidth and/or requesting digital media. The time slots in the bandwidth allocation message can be defined by the scheduling entity 20 according to respective timestamps in the respective time domain. The time slots are scheduled at future times that can instruct the respective cable modems 18 when to provide the respective upstream burst transmissions. The CMC 16 can, upon receiving the upstream burst transmissions, packetize the upstream burst transmissions to provide a corresponding data packet to the network TS 12.

Figure 2:
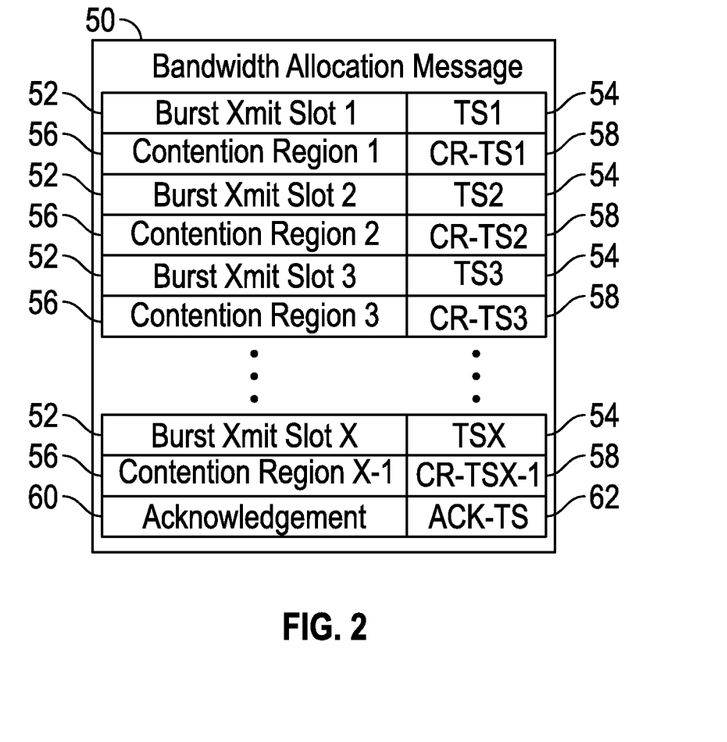
FIG. 2 illustrates an example of a bandwidth allocation message.

FIG. 2 illustrates an example of a bandwidth allocation message 50. For example, the bandwidth allocation message 50 can correspond to a MAP message in a DOCSIS network system. The bandwidth allocation message 50 can be generated, for example, by the scheduling entity 20 in the network TS 12 in the example of FIG. 1. Therefore, reference is to be made to the example of FIG. 1 in the following description of the example of FIG. 2.

The bandwidth allocation message 50 includes a plurality X of burst transmission time slots 52, where X is a positive integer denoting the number of time slots. Each time slot thus can correspond to an interval of time within which a given one of the cable modems 18 is to begin transmission of a respective upstream burst transmission. Each of the burst transmission time slots 52 can be defined by a respective one or more timestamps 54. For example, a given time stamp can specify a beginning time of the respective burst transmission time slot 52 or it can specify a beginning and end time of the respective burst transmission time slot 52. The timestamps 54 can thus correspond to future times at which the respective cable modems 18 can begin and/or end their respective upstream burst transmission to the CMC 16. Each of the burst transmission time slots 52 can correspond to a given one of the cable modems 18, such that a given one of the cable modems 18 can be associated with one or more of the burst transmission time slots 52 in the bandwidth allocation message 50.

The bandwidth allocation message 50 also includes a plurality X−1 of contention regions 56 that are interleaved with the burst transmission time slots 52. The contention regions 56 can correspond to spaces in time between the burst transmission time slots 52, such as to provide temporal gaps between consecutive transmissions of respective upstream burst transmissions from respective separate cable modems 18. The contention regions 56 can be defined based on contention region timestamps 58. While the bandwidth allocation message 50 is demonstrated as including both the timestamps 54 corresponding to the burst transmission time slots 52 and the timestamps 58 corresponding to the contention regions 56, it is to be understood that the contention region timestamps 58 could correspond to the timestamps 54 of the burst transmission time slots 52. For example, a given contention region 56 can be defined by an end timestamp 54 of a preceding burst transmission time slot 52 and by a beginning timestamp 54 of a subsequent burst transmission time slot 52, such that the given contention region 56 does not require a dedicated timestamp 58 but instead can be defined based on one or more existing burst transmission time slots allocated for other purposes.

Additionally, the bandwidth allocation message 50 can include an acknowledgement 60 that includes an acknowledgement timestamp 62. The acknowledgement 60 can indicate via the acknowledgement timestamp 62 a past time corresponding to an end time when the network TS 12 received the last and most recent upstream burst transmission provided from the cable modems 18. Thus, the cable modems 18 can utilize the acknowledgement timestamp 62 to determine if previously provided upstream burst transmissions were received by the network TS 12. For example, in response to determining that a given upstream burst transmission was not received by the network TS 12, such as based on the acknowledgement timestamp 62 preceding the time of transmission of the given upstream burst transmission, the cable modem 18 can attempt to re-transmit the given upstream burst transmission.

Referring back to the example of FIG. 1, the scheduling entity 20 in the network TS 12 can define the timestamps 54, 58, and 62 of the bandwidth allocation message 50 in the first time domain 22, such as based on a clock system that is local to the network TS 12 (e.g., a 10.24 MHz clock). In some examples, however, based on geographic separation of various parts of the system 10, the CMC 16 may not be able to operate in the first time domain 22. Therefore, the CMC 16 includes a second time domain 24 that can be based on a clock system that is local to the CMC 16, which is different from the first time domain 22. As an example, the frequency of the clock signal in the second time domain 24 can have a frequency that is approximately equal to the clock signal in the first time domain 22 (e.g., 10.24 MHz). However, physical (e.g., spatial) separation and lack of common clock source can cause differences between the first and second time domains 22 and 24. For example, the differences can be due to phase differences, drift, and asymmetrical signal transmission between the network TS 12 and the CMC 16. Thus, because the timestamps 54, 58, and 62 are provided in the first time domain 22, the CMC 16 may not be able to properly receive the upstream burst transmissions based on timing mismatches between the first and second time domains 22 and 24. Therefore, the CMC 16 includes a scheduling processor 26 that is configured to implement re-stamping of the timestamps 54, 58, and 62 of the bandwidth allocation message 50 in the second time domain 24.

As an example, the scheduling processor 26 can be configured to execute instructions for implementing a re-stamping algorithm that is configured to analyze the bandwidth allocation message 50 to determine relative timing between the respective timestamps 54, 58, and 62, and to re-stamp the respective timestamps 54, 58, and 62 in the second time domain 24. The re-stamped timestamps can be provided in an updated bandwidth allocation message that is transmitted by the CMC 16 to the cable modems 18. Therefore, the cable modems 18 can be provided with timestamps that are provided in the second time domain 24, such that the timing of the upstream burst transmissions from the cable modems 18 to the CMC 16 can be substantially consistent to substantially mitigate timing mismatches between the network TS 12 and the CMC 16. In other words, the scheduling processor 26 can operate in the second time domain 24 and can substantially maintain consistent upstream bandwidth allocations of the cable modems 18 as set forth in the bandwidth allocation message 50 generated by the scheduling entity 20 in the first time domain 22.

Figure 3:
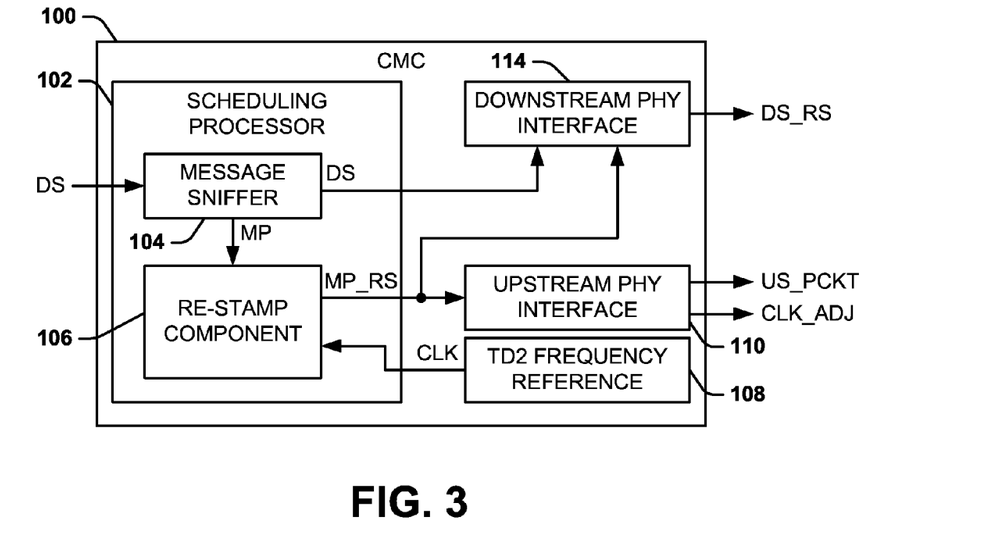
FIG. 3 illustrates an example of a Coax Media Converter (CMC).

FIG. 3 illustrates an example of a CMC 100. The CMC 100 can correspond to the CMC 16 the example of FIG. 1, such that the CMC 100 can interconnect the network TS 12 via a fiber-optic communication link and a plurality of the cable modems 18 via coaxial cable connections. Therefore, reference can be made to the example of FIGS. 1 and 2 in the following description of the example of FIG. 3 for additional context.

The CMC 100 includes a scheduling processor 102 that includes a message sniffer 104 and a re-stamp component 106. The message sniffer 104 can be configured to monitor a data stream DS that can be provided from the network TS 12 for a bandwidth allocation message provided by the network TS 12. As an example, the data stream DS can be a Motion Picture Experts Group (MPEG) data stream carried within an Internet Protocol (IP) data tunnel (e.g., a Downstream External PHY Interface (DEPI) tunnel). The downstream data stream DS can contain IP data packets (e.g., comprising one or more MPEG frames), and the message sniffer 104 can be configured to monitor the IP packets within the MPEG data stream. The message sniffer 104 thus can monitor the IP data tunnel for detecting a MAP message. In response to detecting the MAP message, the message sniffer 104 can extract the bandwidth allocation message MP from the IP data tunnel and can provide the bandwidth allocation message MP to the re-stamp component 106.

The re-stamp component 106 can implement an algorithm that is configured to analyze the timestamps 54, 58, and 62 that are provided in the first time domain 22 to determine relative timing between the timestamps 54, 58, and 62. The re-stamp component 106 can thus implement re-stamping of the timestamps 54, 58, and 62 in the second time domain 24 based on the relative timing determined for the respective timestamps. In the example of FIG. 3, the CMC 100 includes a second time domain (TD2) frequency reference 108, which can be configured as a phase-locked loop that generates a clock signal CLK having a frequency that is approximately the same as the clock system in the first time domain 22 (e.g., 10.24 MHz). Thus, the re-stamp component 106 can be configured to generate updated timestamps in the second time domain 24 based on the clock signal CLK, such as based on the relative timing of the timestamps 54, 58, and 62 in the first time domain 22 and based on sufficient latency of transmission of an updated bandwidth allocation message to the cable modems 18.

As an example, the re-stamping algorithm that can be implemented by the re-stamp component 106 in a DOCSIS network system can be demonstrated by the following pseudo-code:

ALGORITHM 1

```
void map_re_stamping (ds-channel, map_pkt)
{
    //
    // init & setup...
    // look up the ID space and associated working context block
    //
    map_generation =
    map_pkt->startAlloc << UsLch->mslot1024_scale;
    if (map_generation != UsPhy->GenerationTimestamp_1024)
    {
        //
        // new generation of map from the Us Scheduler Entity.
        //
        UsPhy->GenerationTimestamp_1024 = map_generation;
        UsLch->primaryDsMapReplCount = 0;
        // check if the last mapEndTime is still within the min-map-adv
        time.
        If (UsPhy->mapEndTimestamp_1024 <
            (current_timestamp + UsPhy->MinMapAdvanced))
```

ALGORITHM 1

```
    {
        // need to reset startAllocTimestamp
        UsPhy->startAllocTimestamp_1024 =
        current_timestamp +
            UsPhy->NomMapAdvanced;
    }
    //
    // update all logical channels' startAllocationTimestamp
    //
    FOR_ALL_LOGICAL_CHANNEL( )
    {
        UsLch->startAllocTimestamp_mslot =
            UsPhy->startAllocTimestamp_1024 >>
            UsLch->mslot1024Scale;
    }
}
// now, it is ok to re-stamp the start allocation time.
map_pkt->startAlloc = UsLch->startAllocTimestamp_mslot;
// compute and save the UsLch->mapEndTimestamp_mslot.
// compare it to the UsPhy->mapEndTimestamp_1024, and save the
farthest into future.
// also saves it as the next mapStartAllocTimestamp_1024.
// check if the mapEndTimestamp is exceeding the (current-time +
mapEndThreshold)
// to see if this is too far into future, which indicates over-run / over-
scheduling scenario.
}
```

Upon generating the updated timestamps in the second time domain 24 that is dictated by the TD2 frequency reference 108, the re-stamp component 106 is configured to generate an updated bandwidth allocation message MP_RS, which can be stored in memory. The updated bandwidth allocation message MP_RS includes the updated timestamps in the second time domain 24. The generation of the updated bandwidth allocation message MP_RS can be performed in a variety of ways, such as based on replacing the previous bandwidth allocation message MP with the updated bandwidth allocation message MP_RS, or by replacing the timestamps 54, 58, and 62 in the previous bandwidth allocation message MP to provide the previous bandwidth allocation message MP. Thus, as described herein, the terms "re-stamp" and "re-stamping" of the timestamps of the bandwidth allocation message MP can encompass replacing the timestamps generated by the scheduling entity 20 in the first time domain 22 with corresponding timestamps in the second time domain 24, either in a new (i.e., updated) corresponding bandwidth allocation message or inserted into the pre-existing bandwidth allocation message.

The updated bandwidth allocation message MP_RS is provided from the re-stamp component 106 to an upstream physical (PHY) interface 110. The upstream PHY interface 110 can thus save the updated bandwidth allocation message MP_RS in the memory, such that the upstream burst transmissions from the cable modems 18 can be collected by the upstream PHY interface 110 for packetization. The updated bandwidth allocation message MP_RS is also provided to a downstream PHY interface 114. The downstream PHY interface 114 can thus transmit the data stream and the updated bandwidth allocation message MP_RS, demonstrated collectively as a signal DS_RS, to the cable modems 18. As an example, the updated bandwidth allocation message MP_RS and the data stream can be transmitted separately to the cable modems 18. As another example, the updated bandwidth allocation message MP_RS can be inserted into the data stream DS, such as via a stream update component (not shown).

In response to receiving the data stream DS_RS that includes the updated bandwidth allocation message MP_RS, the cable modems 18 can transmit respective upstream burst transmissions at future times that are dictated by the re-stamped timestamps in the updated bandwidth allocation message MP_RS. The upstream PHY interface 110 can thus receive the upstream burst transmissions at the appropriate times corresponding to the respective cable modems 18 (e.g., at adjusted upstream burst time slots based on the re-stamped timestamps). The upstream PHY interface 110 can thus generate a data packet that includes the upstream burst transmissions. The upstream PHY interface 110 can thus transmit the data packet to the network TS via the fiber-optic connection, demonstrated via the signal US_PCKT.

As a result of the re-stamping of the timestamps in the bandwidth allocation signal MP in the first time domain 22 with updated timestamps in the second time domain 24, the CMC 100 and the network TS 12 can cooperate in separate time domains to communicate with substantially reduced timing problems. However, because the clock system in the first time domain 22 can be a separate physical clock relative to the TD2 frequency reference 108 in the second time domain 24, clock drift can still occur, even at the same approximate frequency of the respective clocks. Therefore, underscheduling and overscheduling conditions may occur with the scheduling of the upstream burst transmissions based on the re-stamping of the timestamps of the bandwidth allocation message MP to generate the updated bandwidth allocation message MP_RS.

In an underscheduling condition, the clock system in the first time domain 22 can be slower than the TD2 frequency reference 108 in the second time domain 24. Such a slower frequency reference in the first time domain 22 relative to the second time domain 24 can result in a delay between the transmission of packets generated by the upstream PHY interface 110 as the CMC 100 consumes bandwidth allocation messages MP faster than the scheduling entity 20 can create bandwidth allocation messages. In other words, in an underscheduling condition, the end timestamps of the bandwidth allocation messages will fall behind. However, based on the analysis of the timestamps 54, 58, and 62 in the bandwidth allocation message MP by the re-stamp component 106, the start allocation time of a given updated bandwidth allocation message MP_RS will be reset and hence moved forward in time, creating a slight gap in transmission of upstream burst transmissions and/or the packet US_PCKT. The frequency of the occurrence of an underscheduling condition depends on how much slower the clock system of the first time domain 22 is relative to the TD2 frequency reference 108 in the second time domain 24. As a result, underscheduling conditions that may occur between the first and second time domains 22 and 24 do not prohibit the re-stamping of the timestamps in the bandwidth allocation message MP, and are similar a control plane software disabling interrupt that delays upstream scheduling, such as can occur in existing CMTS systems.

In an overscheduling condition, the clock system in the first time domain 22 can be faster than the TD2 frequency reference 108 in the second time domain 24. Such a faster frequency reference in the first time domain 22 relative to the second time domain 24 can result in a demand for upstream burst transmissions that will cause the upstream PHY interface 110 to fall behind in providing the packet US_PCKT as the CMC 100 consumes bandwidth allocation messages MP slower than the scheduling entity 20 can create bandwidth allocation messages. The CMC 100 can detect an overscheduling condition, such as via the scheduling processor 102, based on a last upstream burst timeslot 52 having an associated timestamp 54 that is further in time than a predetermined threshold time. The threshold can be set to a time interval that is a predetermined time from a timestamp 54 associated with a first upstream burst timeslot 52. In response to detecting an overscheduling condition, the CMC 100 can substantially mitigate the overscheduling condition.

As an example, in response to the scheduling processor 102 detecting the overscheduling condition, the CMC 100 can provide a signal to the network TS 12 to adjust the timing of the first time domain 22. The CMC 100 (e.g., via the scheduling processor 102) can command the upstream PHY interface 110 to generate a signal CLK_ADJ having a frequency that is separate from a frequency of the data stream DS and/or a frequency of the packets US_PCKT. The signal CLK_ADJ can thus be indicative of the overscheduling condition, and can be interpreted by the network TS 12 to substantially adjust the timing in the first time domain 22. As an example, the signal CLK_ADJ can reduce a frequency of the clock system in the first time domain 22. As another example, the signal CLK_ADJ can adjust the timing of the scheduling entity 20 with respect to the generation of the timestamps in the bandwidth allocation message MP, such as to slightly increase a time duration between consecutive timestamps 54 and/or 58, and/or to decrease a frequency at which the bandwidth allocation messages MP are transmitted to the CMC 100.

As another example, in response to detecting the overscheduling condition, the re-stamp component 106 can be configured to re-stamp the bandwidth allocation message MP to accommodate the overscheduling condition. For example, the re-stamp component 106 can substantially reduce the duration of contention regions 56 between the respective consecutive burst transmission timeslots 54, such as to provide for the sufficient number of upstream burst transmissions in a lesser duration of time. As another example, the re-stamp component 106 can substantially eliminate the contention regions 56 between the respective consecutive burst transmission timeslots 54.

Figure 4:
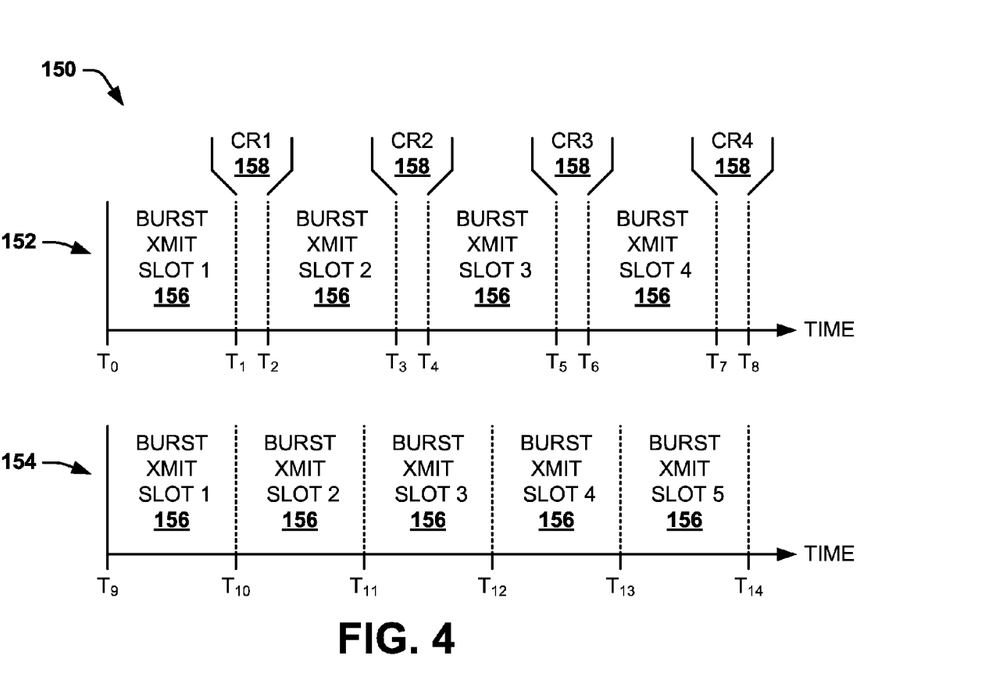
FIG. 4 illustrates an example of a timing diagram.

FIG. 4 illustrates an example of a timing diagram 150. The timing diagram 150 includes the timing of a bandwidth allocation message, demonstrated at 152, and the timing of an updated bandwidth allocation message, demonstrated at 154. In the example of FIG. 4, the timing of the bandwidth allocation message 152 and the updated bandwidth allocation message 154 are substantially time-aligned with respect to a beginning of the respective bandwidth allocation messages 152 and 154, which thus may not be the same in real time.

The bandwidth allocation message 152 includes a plurality of burst transmission timeslots 156 that are each separated by a plurality of contention regions 158. In the example of FIG. 4, a first timeslot 156 has a timestamp $T_0$ indicating a future time for an upstream burst transmission from a cable modem 18, and a first contention region 158 has a timestamp $T_1$ indicating an end of the first timeslot 156. A second timeslot 156 has a timestamp $T_2$ that indicates a future time after the timestamp $T_1$ for an upstream burst transmission from a cable modem 18, and thus defines the end of the first contention region 158, which has a duration between the time $T_1$ and the time $T_2$. Similarly, a second contention region 158 begins at a time indicated by a timestamp $T_3$, a third timeslot 156 begins at a later time indicated by a timestamp $T_4$, a third contention region 158 begins at a time indicated by a timestamp $T_5$, a fourth timeslot 156 begins at a later time indicated by a timestamp $T_6$, and a fourth contention region 158 begins at a time indicated by a timestamp $T_7$, ending at a time indicated by a timestamp $T_8$. Therefore, the timestamps $T_0$ through $T_8$ are timestamps in the first time domain 22.

As described previously, in response to the detection of the overscheduling condition, the re-stamp component 106 can be configured to re-stamp the timestamps of the bandwidth allocation message MP to substantially eliminate the contention regions 158. In the example of FIG. 4, the re-stamp component 106 can re-stamp the first timestamp $T_0$ in the first time domain 22 as a timestamp $T_9$ in the second time domain 24 corresponding to the beginning of the first timeslot 158. Similarly, the re-stamp component 106 can re-stamp the second timestamp $T_1$ as a timestamp $T_{10}$ corresponding to the end of the first timeslot 158, and thus preserving the time duration of the first timeslot 158. However, the re-stamp component 106 can re-stamp the timestamp $T_2$, corresponding to the beginning of the second timeslot 156 as the timestamp $T_{10}$, thus omitting the first contention region 158 between the first and second timeslots 156. Similarly, the re-stamp component can re-stamp the timestamps $T_3$ and $T_4$ as a timestamp $T_{11}$ corresponding to the beginning of the third timeslot 158, can re-stamp the timestamps $T_5$ and $T_6$ as a timestamp $T_{12}$ corresponding to the beginning of the fourth timeslot 158, and can re-stamp the timestamps $T_7$ and $T_8$ as a timestamp $T_{13}$ corresponding to the beginning of a fifth timeslot 158. The re-stamp component 106 can also provide a timestamp $T_{14}$ corresponding to an end of the fifth timeslot 158. Therefore, the timestamps $T_9$ through $T_{14}$ are timestamps in the second time domain 24.

As demonstrated in the timing diagram 150, in substantially the same duration of time, the updated bandwidth allocation message 154 includes an additional timeslot 156 relative to the bandwidth allocation message 152 based on the substantial elimination of the contention regions 158 between the timeslots 156 in the bandwidth allocation message 156. Therefore, the re-stamp component 106 can substantially mitigate the overscheduling condition based on providing for the scheduling of the sufficient (e.g., required) number of upstream burst transmissions in a lesser duration of real time. It is to be understood that, in the example of FIG. 4, the contention regions 158 are demonstrated to be eliminated in the updated bandwidth allocation message 154 for simplicity of demonstration, and that the re-stamp component 106 could instead be configured to substantially reduce the contention regions 158 to mitigate the overscheduling condition.

Figure 5:
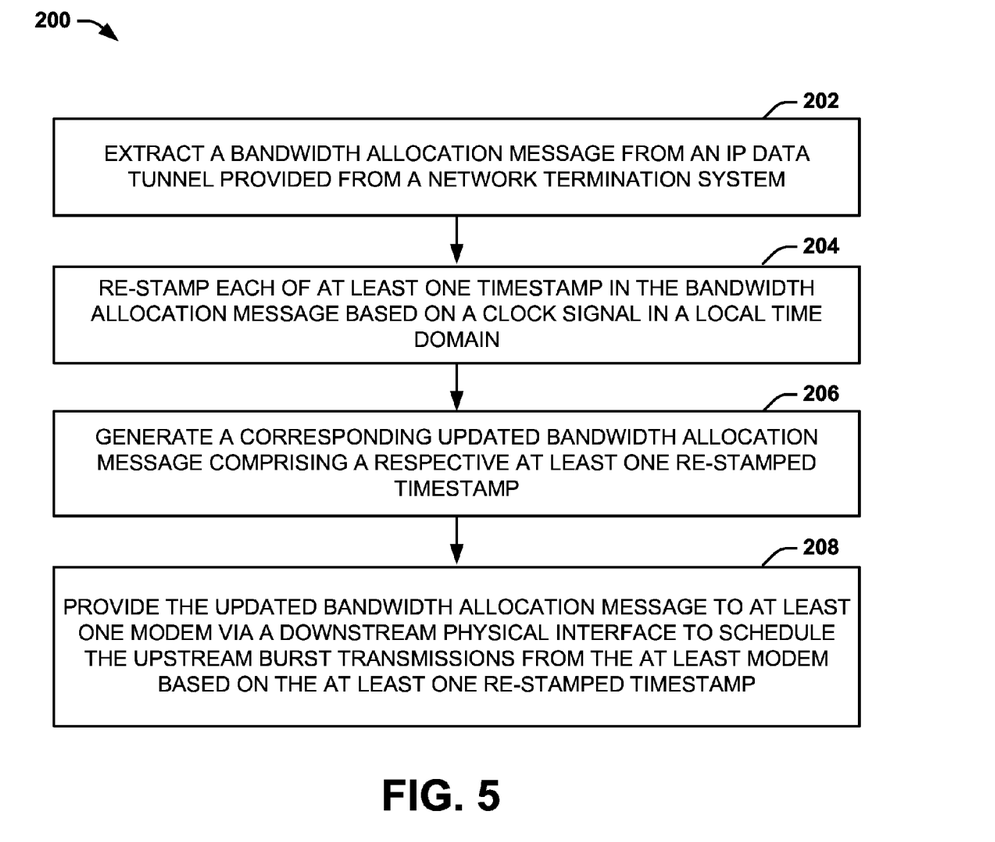
FIG. 5 illustrates an example of a method for scheduling upstream burst transmissions from at least one modem.

In view of the foregoing structural and functional features described above, a method in accordance with various aspects of the present invention will be better appreciated with reference to FIG. 5. While, for purposes of simplicity of explanation, the methods of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect of the present invention. The methods or portions thereof can be implemented as instructions stored in a non-transitory storage medium as well as be executed by a processor of a computer device, for example.

FIG. 5 illustrates an example of a method 200 for scheduling upstream burst transmissions from at least one modem (e.g., the cable modems 18). At 202, a bandwidth allocation message (e.g., the bandwidth allocation message 50) is extracted from a data stream (e.g., an MPEG data stream) carried within an IP data tunnel (e.g., in the data stream DS) provided from a network termination system (e.g., the network TS 12). At 204, each of at least one timestamp (e.g., the timestamps 54, 58, and/or 62) in the bandwidth allocation message is re-stamped based on a clock signal (e.g., the clock signal CLK provided by the TD2 frequency reference 108) in a local time domain (e.g., the second time domain 24). At 206, a corresponding updated bandwidth allocation message (e.g., the updated bandwidth allocation message MP_RS) is generated. The updated bandwidth allocation message can include one or more respective re-stamped timestamp that has been generated. At 208, the updated bandwidth allocation message is provided to at least one modem via a downstream physical interface (e.g., the downstream PHY interface 114) to schedule the upstream burst transmissions from the respective at least modem based on the at least one re-stamped timestamp.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. An apparatus comprising:
   a frequency reference configured to generate a clock signal in a local time domain;
   a scheduling processor configured to:
      extract a bandwidth allocation message from a data stream and to re-stamp each of at least one timestamp in the bandwidth allocation message in the local time domain based on the clock signal,
      generate a corresponding updated bandwidth allocation message comprising a respective at least one re-stamped timestamp, and
      monitor the data stream provided in a data tunnel from a network termination system for the bandwidth allocation message and to extract the bandwidth allocation message for processing via the scheduling processor; and
   a physical interface configured to transmit the updated bandwidth allocation message to schedule upstream burst transmissions of data from at least one modem based on the at least one re-stamped timestamp.

2. The apparatus of claim 1, wherein the scheduling processor comprises a re-stamp component configured to analyze upstream bandwidth allocations corresponding to the at least one timestamp in the bandwidth allocation message and to assign the at least one re-stamped timestamp in the local time domain to substantially maintain the upstream bandwidth allocations.

3. The apparatus of claim 1, wherein the updated bandwidth allocation message is provided for downstream transmission by the physical interface within the data tunnel to the at least one modem.

4. The apparatus of claim 1, wherein the physical interface is a downstream physical interface, the system further comprising an upstream physical interface configured to receive the updated bandwidth allocation message from the scheduling processor, to receive the upstream burst transmissions from the at least one modem based on the at least one re-stamped timestamp, and to packetize the upstream burst transmissions for transmission to a network termination system in the network system.

5. The apparatus of claim 1, wherein the scheduling processor is configured to determine an overscheduling condition based on at least one of the at least one re-stamped timestamp exceeding a predetermined threshold time, the overscheduling condition corresponding to a clock signal in a remote time domain of a network termination system being faster than the clock signal in the local time domain.

6. The apparatus of claim 5, wherein the scheduling processor is configured, in response to determining the overscheduling condition, to transmit a timing message to the network termination system in a frequency band separate from a frequency band associated with the data stream to instruct the network termination system to decrease a frequency of the clock signal in the remote time domain.

7. The apparatus of claim 5, wherein the bandwidth allocation message comprises at least one contention region of time between each upstream transmission time slot associated with the at least one timestamp, and wherein the scheduling processor is configured, in response to determining the overscheduling condition, to re-stamp each of the at least one timestamp in the bandwidth allocation message in the local time domain to reduce the at least one contention region of time.

8. The apparatus of claim 1, wherein the scheduling processor is further configured to re-stamp an acknowledgement in the bandwidth allocation message in the local time domain based on the clock signal to generate a re-stamped acknowledgement and to insert the re-stamped acknowledgement into the updated bandwidth allocation message, the re-stamped acknowledgement corresponding to a time that a network termination system received the upstream burst transmissions.

9. A method comprising:
   extracting a bandwidth allocation message from a data stream of an Internet Protocol (IP) data tunnel provided from a network termination system;
   re-stamping each of at least one timestamp in the bandwidth allocation message based on a clock signal in a local time domain that is separate from a time domain of the network termination system;
   generating a corresponding updated bandwidth allocation message comprising a respective at least one re-stamped timestamp;
   providing the updated bandwidth allocation message to at least one modem via a downstream physical interface to schedule the upstream burst transmissions from the at least modem based on the at least one re-stamped timestamp;
   comparing each of the at least one re-stamped timestamp with a predetermined threshold time; and
   determining an overscheduling condition based on at least one of the at least one re-stamped timestamp exceeding the predetermined threshold time, the overscheduling condition corresponding to a clock signal in a remote time domain associated with an upstream termination system being faster than the clock signal in the local time domain.

10. The method of claim 9, further comprising transmitting a timing message to the network termination system in a frequency band separate from a frequency band associated with the IP data tunnel to instruct the termination system to decrease a frequency of the clock signal in the remote time domain in response to determining the overscheduling condition.

11. The method of claim 9, wherein the bandwidth allocation message comprises at least one contention region of time between each upstream transmission time slot associated with the at least one timestamp, wherein re-stamping each of at least one timestamp comprises re-stamping each of the at least one timestamp in the bandwidth allocation message in the local time domain to reduce the at least one contention region of time in response to determining the overscheduling condition.

12. The method of claim 9, further comprising:
   providing the updated bandwidth allocation message to an upstream physical interface;
   receiving the upstream burst transmissions from the at least one modem based on the at least one re-stamped timestamp; and
   packetizing the upstream burst transmissions for transmission to the network termination system.

13. The method of claim 9, wherein the method further comprises:
   re-stamping an acknowledgement in the bandwidth allocation message in the local time domain based on the clock signal to generate a re-stamped acknowledgement, the acknowledgement corresponding to a time that the network termination system received the upstream burst transmissions; and
   inserting the re-stamped acknowledgement into the updated bandwidth allocation message.

14. An apparatus comprising:
   a frequency reference configured to generate a clock signal in a local time domain;
   a scheduling processor configured to:
      extract a bandwidth allocation message from a data stream and to re-stamp each of at least one timestamp in the bandwidth allocation message in the local time domain based on the clock signal,
      generate a corresponding updated bandwidth allocation message comprising a respective at least one re-stamped timestamp;
      determine an overscheduling condition based on at least one of the at least one re-stamped timestamp exceeding a predetermined threshold time, the overscheduling condition corresponding to a clock signal in a remote time domain of a network termination system being faster than the clock signal in the local time domain; and
   a physical interface configured to transmit the updated bandwidth allocation message to schedule upstream burst transmissions of data from at least one modem based on the at least one re-stamped timestamp.

15. The apparatus of claim 14, wherein the scheduling processor comprises a re-stamp component configured to analyze upstream bandwidth allocations corresponding to the at least one timestamp in the bandwidth allocation message and to assign the at least one re-stamped timestamp in the local time domain to substantially maintain the upstream bandwidth allocations.

16. The apparatus of claim 14, wherein the scheduling processor is further configured to monitor the data stream provided in a data tunnel from a network termination system for the bandwidth allocation message and to extract the bandwidth allocation message for processing via the scheduling processor.

17. The apparatus of claim 16, wherein the updated bandwidth allocation message is provided for downstream transmission by the physical interface within the data tunnel to the at least one modem.

18. The apparatus of claim 14, wherein the physical interface is a downstream physical interface, the system further comprising an upstream physical interface configured to receive the updated bandwidth allocation message from the scheduling processor, to receive the upstream burst transmissions from the at least one modem based on the at least one re-stamped timestamp, and to packetize the upstream burst transmissions for transmission to a network termination system in the network system.

19. The apparatus of claim 14, wherein the scheduling processor is configured, in response to determining the over-scheduling condition, to transmit a timing message to the network termination system in a frequency band separate from a frequency band associated with the data stream to instruct the network termination system to decrease a frequency of the clock signal in the remote time domain.

20. The apparatus of claim 14, wherein the scheduling processor is further configured to re-stamp an acknowledgement in the bandwidth allocation message in the local time domain based on the clock signal to generate a re-stamped acknowledgement and to insert the re-stamped acknowledgement into the updated bandwidth allocation message, the re-stamped acknowledgement corresponding to a time that a network termination system received the upstream burst transmissions.

* * * * *